United States Patent [19]

Toutant et al.

[11] Patent Number: 4,604,715
[45] Date of Patent: Aug. 5, 1986

[54] ROBOTIC INSPECTION SYSTEM

[75] Inventors: Roy T. Toutant; Gerald J. Lozinski, both of Louisville, Ky.

[73] Assignee: General Electric Company, Louisville, Ky.

[21] Appl. No.: 662,842

[22] Filed: Oct. 19, 1984

[51] Int. Cl.[4] .............................................. G06F 15/46
[52] U.S. Cl. ..................................... 364/513; 318/640; 356/400; 901/44; 901/47
[58] Field of Search ............... 364/513, 478, 191–193; 414/730; 901/44, 45, 46, 47, 23, 24, 32, 33, 35, 38; 250/224, 227, 491.1; 356/399–401; 318/640; 29/406, 407

[56] References Cited

U.S. PATENT DOCUMENTS

| | | | |
|---|---|---|---|
| 3,448,280 | 6/1969 | Blitchington, Jr., et al. | 250/227 |
| 3,541,243 | 11/1970 | Whitsel | 178/6.6 |
| 3,888,362 | 6/1975 | Fletcher et al. | 318/640 X |
| 4,187,051 | 2/1980 | Kirsch et al. | 901/47 X |
| 4,295,198 | 10/1981 | Copeland et al. | 364/515 |
| 4,386,344 | 5/1983 | Vecchiatto | 340/680 |
| 4,406,949 | 9/1983 | Spohnheimer | 250/548 |

OTHER PUBLICATIONS

A Textbook of Geometrical Drawing by William Minifie, 1849, pp. 31, 32.

*Primary Examiner*—Joseph Ruggiero
*Attorney, Agent, or Firm*—Frederick P. Weidner; Radford M. Reams

[57] ABSTRACT

The method of inspecting and determining the status of a hole in a surface of a part comprising placing a robot at a stationary position, said robot being controlled by a programmable controller and having a movable arm with a fiber optic scanner device capable of sensing a reflective surface. The part to be inspected is placed in a stationary fixture spaced from the robot and the robot arm with the fiber optic scanner device is moved to a point spaced from the part surface. The robot arm with the fiber optic scanner is incrementally moved closer to the part surface until light reflection is detected from the part surface by the fiber optic scanner. A signal is sent to the robot controller upon detecting light reflection from the part surface to stop further incremental movement of the robot arm and fiber optic scanner closer to the part. The robot arm with the fiber optic scanner is then moved in response to a signal from the robot controller parallel to the part surface to a predetermined position representing where the approximate hole location should be and determining by reflective value the presence or absence of the hole and sending a corresponding signal to the robot controller.

8 Claims, 6 Drawing Figures

ROBOTIC INSPECTION SYSTEM

BACKGROUND OF THE INVENTION

The present invention relates to inspection of parts particularly for an assembly line wherein there is a need to compare dimensions to standards and to do the inspection automatically as by use of a robot.

The use of robots controlled by a programmable controller for inspection presents a problem in that the inspection system or process has to minimize the risk of damage to the part being inspected and/or to the robot doing the inspection procedure and particularly the end effector that actually does the inspection located at the end of the robot arm. In addition, such a robotic inspection system needs to have the flexibility to be easily changed to accommodate desired accuracy of the part inspection depending upon the particular complexity of the product being assembled and the accuracy of the inspection required for proper manufacturing procedures. That is, the inspection program of certain parts or components of a product during manufacture assembly may require a high degree of accuracy such as the status of a hole in the part for proper critical adjustment of other components relative to that hole whereas in other inspection programs the accuracy may not be as critical and therefore some of the more detailed inspection of the part can be eliminated from the inspection program.

By this invention there is provided a robotic inspection system that can inspect parts automatically and the inspection system minimizes the risk of damage to the part and/or the robot and its end effector and also provides an inspection system that can be easily changed to accommodate the desired accuracy required in the part being inspected.

SUMMARY OF THE INVENTION

There is provided a method of inspecting and determining the status of a hole in the surface of a part comprising placing a robot at a stationary position, said robot being controlled by a programmable controller and having a movable arm with a fiber optic scanner capable of sensing a reflective surface. The part to be inspected is placed in a stationary fixture spaced from the robot and the robot arm with the fiber optic scanner is moved to a point spaced from the part surface. The robot arm with the fiber optic scanner is incrementally moved closer to the part surface until light reflection is detected from the part surface by the fiber optic scanner. Upon detecting light reflection from the part surface a signal is sent to the robot controller to stop further incremental moving of the robot arm with fiber optic scanner closer to the part. The robot arm with fiber optic scanner is then moved in response to a signal from the robot controller parallel to the part surface to a predetermined position representing where the approximate hole location in the part should be and determining by reflectivity value the presence or absence of the hole and sending a corresponding signal to the robot controller.

DESCRIPTION OF THE PREFERRED EMBODIMENT

Figure 1:
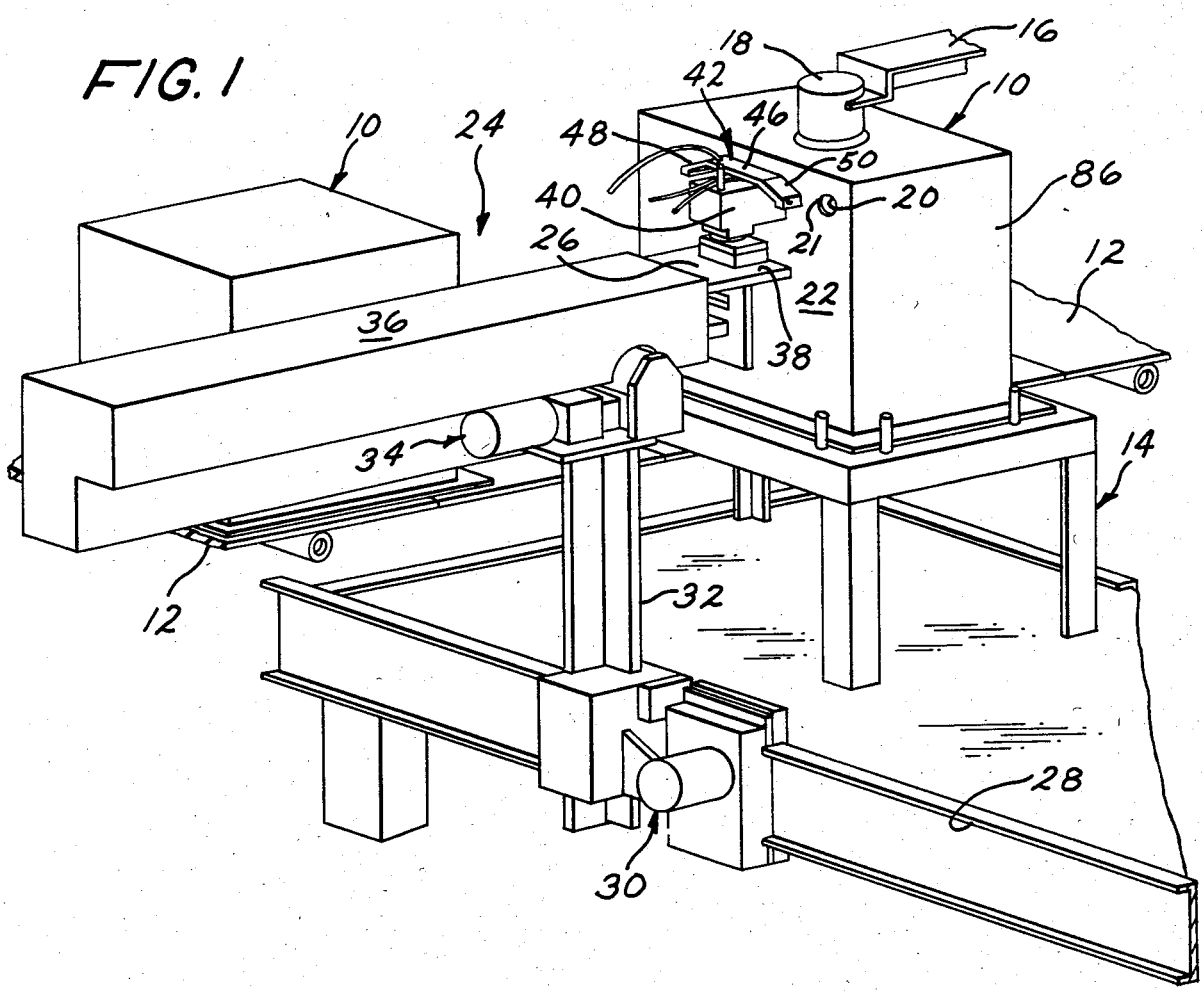
FIG. 1 is a perspective view of an inspection station including the robot inspection equipment utilized in the present invention.

With reference to FIG. 1 there is shown the equipment utilized in the robotic inspection system of the present invention as it is set up to inspect parts 10 being moved along a conveyor 12 utilized in the normal manufacturing assembly of a product. The part 10 as shown in FIG. 1 is a microwave oven cavity which has been formed from sheet metal and will normally have a number of holes which will be utilized to accommodate other components to be assembled in connection with the microwave oven cavity. Adjacent the conveyor 12 on which the parts 10 are moving for the purpose of assembly there is a part fixture 14 which is quite rigid and sturdy and will accept the part 10 from the conveyor line in a very precise orientation so that the inspection of the part may be accurate. The part 10 may be removed from the conveyor 12 by means of a robot arm 16 having at the end thereof a vacuum gripper 18 both of which may be programmed by a programmable controller to remove one part 10 from the conveyor 12, place it accurately in the fixture 14 whereupon the part 10 is ready for inspection. While the part 10 may be inspected for various conditions when in the fixture 14, for purposes of the preferred embodiment description of the robotic inspection system of the present invention the inspection will determine the status of a hole 20 with an edge 21 in one wall 22 of the part 10.

A robot 24 is located at a stationary position spaced from the fixture 14 and the robot is controlled by a programmable controller (not shown) which controls the movement of the robot arm 26 during the inspection process. The robot 24 includes a horizontal track 28 which has motor means 30 capable of moving the robot arm 26 along the horizontal track 28 to a desired location depending upon the part to be inspected. The robot 24 also has a vertical track 32 which by motor means 34 can move the robot arm 26 up and down along the vertical track 32 to a desired location. The robot arm 26 has a housing 36 which remains stationary during the robot inspection process while the robot arm 26 moves relative to the housing 36 horizontally toward and away from the part 10 located on the fixture 14. The mechanism (not shown) for the robot arm reciprocation movement is located within the housing 36. The robot 24 is adjusted to provide for the correct horizontal and vertical positioning of the robot arm 26 relative to the particular part to be sequentially inspected from the assembly line.

At the terminal end 38 of the robot arm 26 there is an end effector 40 which is rotatable in a horizontal plane relative to the robot arm 26. In FIG. 1 the end effector is shown facing the wall 22 of the part 10. The end effector may be rotated horizontally ninety degrees in either direction from that position for purposes of the inspection process.

Figure 2:
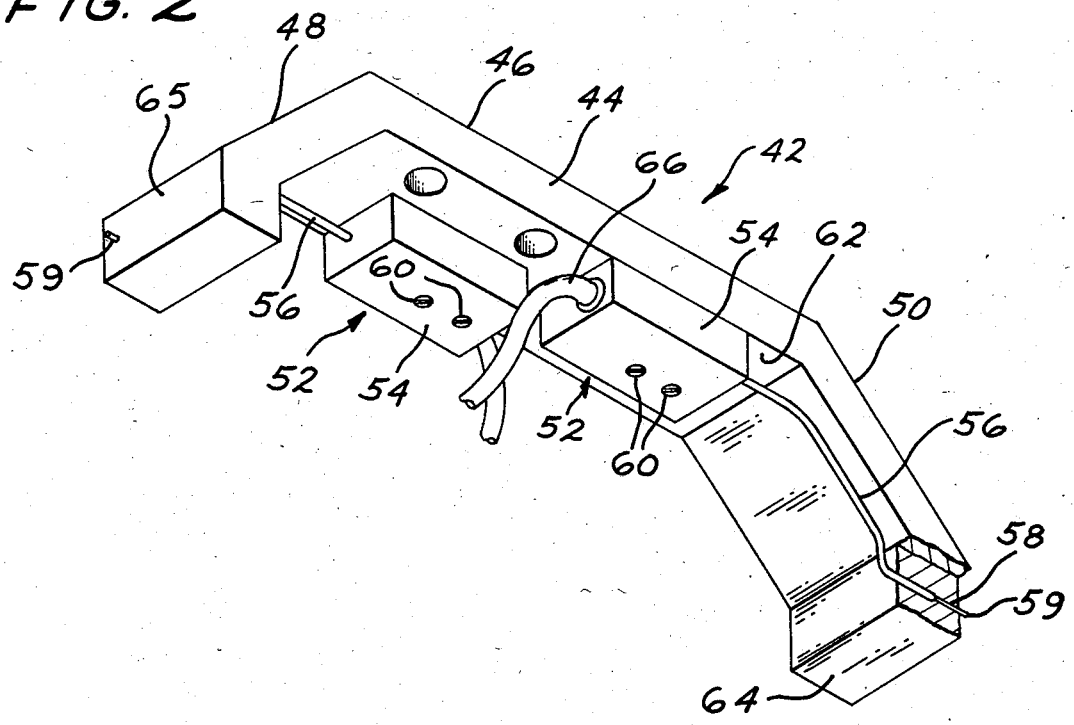
FIG. 2 is a perspective view of the robot end effector and the fiber optic scanner device utilized in the present invention.

Mounted on top of the end effector 40 is a yoke assembly 42 which is secured to the end effector so that it rotates horizontally in unison with the end effector. The yoke assembly 42 is shown in greater detail in FIG. 2 and includes a frame 44 having a straight, horizontal section 46 terminating at each end in downwardly directed slanted section 48 and 50 respectively. Underneath the yoke frame 44 is mounted a fiber optic scanner device 52 of the type available in the commercial market. The fiber optic scanner device 52 includes a back body 54, a flexible sheathed snout 56 and a coaxial optic fiber bundle 58 therethrough having a terminal end 59. As can be seen in FIG. 2 the back body 54 is secured by fasteners 60 to the bottom surface 62 of the straight, horizontal section 46 of the yoke frame 44 and has leading therefrom the flexible sheathed snout 56 which may be shaped or bent to the contour desired with the coaxial optic fiber bundle passing through an opening in the terminal end 64 of the yoke frame 44 to expose the terminal end 59 of the coaxial optic fiber bundle. The back body of the fiber optic scanner device contains a lamp or LED which transmits light coaxially to a target with a reflecting surface through the outer diameter of glass fibers sheathed in the flexible snout 56. Light or IR energy then reflects from the target back through the inner fiber optic bundle to a photo transistor (not shown) in the back body. The back body also includes a light sensor to detect the light being reflected from a reflecting surface of the target. Wires 66 lead to a photo-electric control (not shown) which amplifies the photo detector signal, provides light source power and also functions as an output switch. It has been found that satisfactory results are obtained with a fiber optic scanner designated S2005-3 series manufactured and sold by Skan-A-Matic Corporation used in conjunction with photo-electric controls R40 and/or T40 series, also manufactured and sold by Skan-A-Matic Corporation. As shown in FIG. 2 two fiber optic scanner devices 52 are mounted on the yoke frame 44 each in opposite directions and having the same components and arranged in the same manner as described above.

Figure 3:
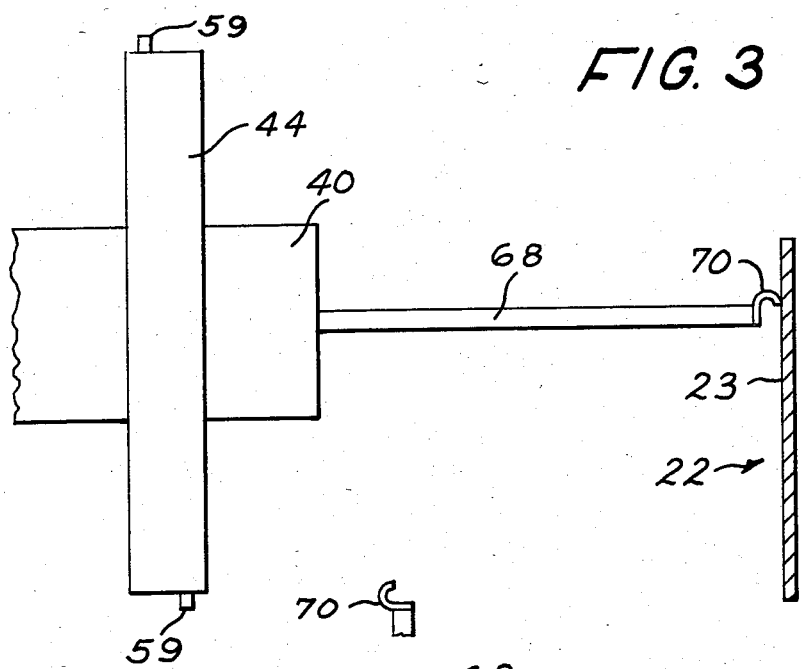
FIG. 3 is a schematic side elevational view of the robot end effector and part to be inspected utilizing the present invention.

With reference to FIG. 3 in the preferred embodiment of the equipment used for the robotic inspection process the end effector 40 of the robot arm 26 has a retractable probe 68 secured in any suitable fashion to the end effector and extends to a terminal end 70 designed to make physical contact with the part 10 and in particular the wall 22 thereof. The retractable probe is of the type that is well known in the industry which upon contacting a rigid surface will retract some specified distance and send a signal to the robot programmable controller to acknowledge that contact has been made with the wall 22. While the probe arrangement shown in FIG. 3 is utilized in the preferred embodiment of the equipment in performing the robotic inspection of the present invention, it is not essential in performing the basic inspection system. However, the probe 68 is utilized as an aid in preventing any undue damage to the part or robot and particularly the end effector during the inspection system process.

The robotic inspection system utilizing the above-described equipment will now be discussed. The robot arm 16 carrying vacuum gripper 18 removes a part 10 from the assembly conveyor 12 and accurately places it in fixture 14 which is spaced from the robot 24 a fixed distance. The robot 24 has had the vertical and horizontal positioning of the robot arm 26 adjusted for inspection of the particular part 10 which in the case shown is a microwave oven cavity made of sheet metal and formed to include a hole 20 in wall 22. The robot arm 26 is positioned for inspection perpendicular to the wall 22 and has the end effector 40 pointing toward the wall 22 with the retractable probe 68 projecting toward the part 10 away from the end effector 40 and perpendicular to the wall 22. Upon command by the robot programmable contoller the robot arm 26 with the end effector 40 is moved toward the wall 22 until the terminal end 70 of the retractable probe 68 makes contact with surface 23 of wall 22. Upon contact an appropriate signal is sent to the programmable controller to terminate further movement of the robot arm 26 toward the part 10. The programmable controller then instructs the robot 24 to rotate the end effector 40 ninety degrees from the position shown in FIG. 3 to the position shown in FIG. 4. In the rotated position the retractable probe is now parallel to the wall 22 and the yoke frame 44 is now perpendicular to the part 10 and wall 22 of that part with the terminal end 59 of the coaxial optic fiber bundle 58 pointed toward the wall 22. Thus, with this procedure the robot arm with the fiber optic scanner device 52 is moved to a point spaced from the wall 22 and is now ready for the next step in the preferred robotic inspection system.

Figure 4:
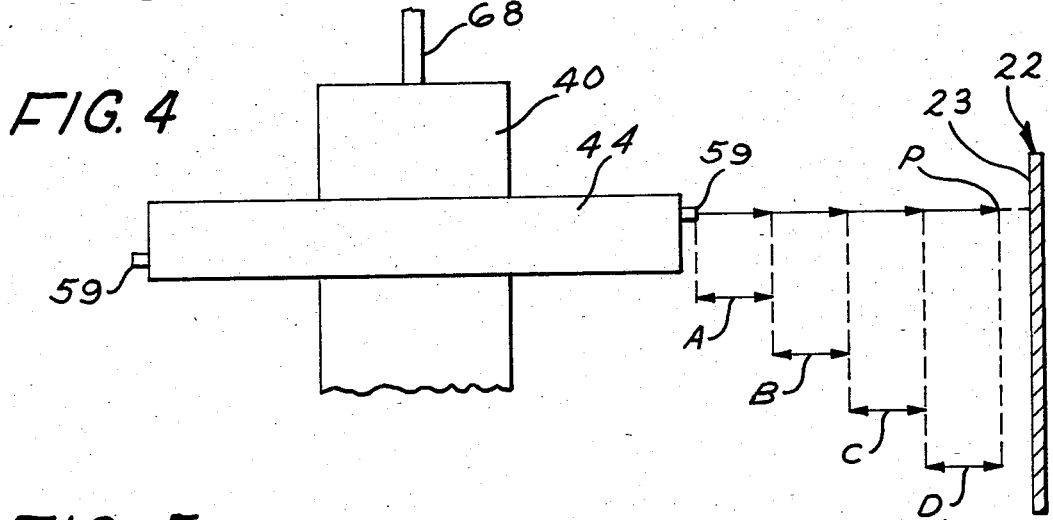
FIG. 4 is a schematic plan view of the robot end effector utilized in the present invention shown relative to the part being inspected in accordance with the present invention.

The programmable controller instructs the robot to move the arm with the fiber optic scanner device 52 in a straight line by increments closer and closer to the part surface 23 until the fiber optic scanner device 52 detects reflectivity from the surface 23. As shown in FIG. 4 the incremental distances or step sizes are designated A, B, C and D respectively and the point of reflective detection is P. The increment step size which moves the tip or terminal end 59 of the coaxial optic fiber bundle toward the surface 23 of wall 22 and the time interval of the incremental steps is adjustable by programming and will depend upon the desired accuracy and time period for the inspection being processed. It may be desirable to also have the programmable controller stop incremental movement of the robot arm and fiber optic scanner device closer to the part surface 23 after a predetermined number of incremental movements and abort the rest of the steps of the method.

Once reflectivity of the surface 23 of wall 22 has been detected at point P a signal is sent to the programmable controller to stop further incremental moving of the fiber optic scanner toward surface 23. The robot arm with the fiber optic scanner is then moved parallel to the part surface 23 to a predetermined position representing where the approximate hole location should be which has been programmed into the inspection system. This movement is implemented by the programmable controller sending appropriate signals to the robot and to cause movement of the robot arm with the fiber optic scanner to the predetermined hole position.

Figure 5:
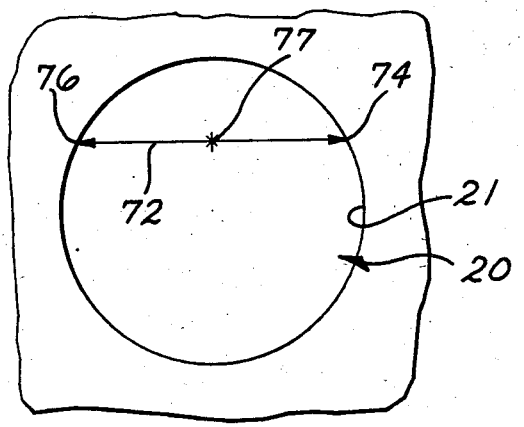
FIG. 5 is a top plan view of a portion of the part being inspected by the present invention showing the hole in the surface of the part.
Figure 6:
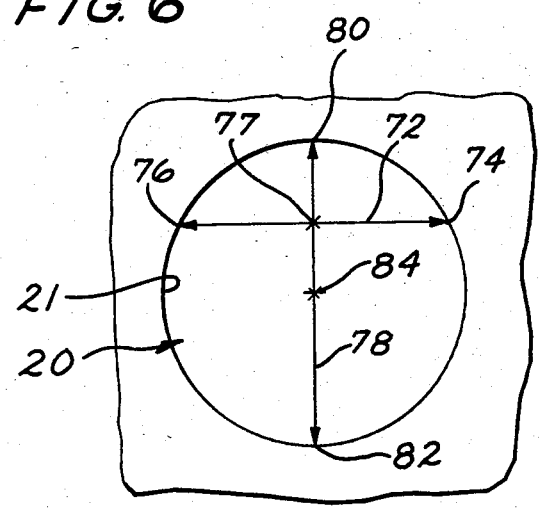
FIG. 6 is similar to FIG. 5 showing the hole in the surface of the part being inspected by the robotic inspection system of the present invention.

Upon movement of the fiber optic scanner terminal end 59 to the approximate hole location the reflectivity value is determined to indicate either the presence or absence of the hole and a corresponding signal is sent to the robot controller. That is, if there is no hole, light will be reflected from surface 23. To the contrary if there is a hole 20 no light will be reflected. If the reflectivity value indicates absence of the hole, the signal sent to the robot controller will abort the rest of the inspection process. Upon confirmation that the hole is present, depending upon the accuracy of the inspection to be achieved, it may be desirable to not only determine the presence or absence of the hole 20 but also determine the center point of a straight line between the two edges of the hole 20. With reference to FIG. 5 this is accomplished by moving the robot arm with fiber optic scanner incremental distances along a straight line 72 until reflectivity is detected at a first point 74 at the edge 21 of the hole 20 and sending a corresponding signal to the robot controller. The robot arm with fiber optic scanner device 52 is then moved incrementally in the reverse direction along the straight line 72 until reflectivity is detected at a second point 76 at the edge 21 to determine the distance between the first point 74 and second point 76 and again a corresponding signal is sent to the robot controller. The robot controller then divides the distance between the point 74 and 76 in half to determine the center point 77 of the straight line 72.

Further refinement of the robotic inspection system may be desired in that not only is the center of a single line to be determined but also the center of the hole 20. In this case the programmable controller will move the robot arm with fiber optic scanner device 52 incrementally along a second straight line 78 through center point 77 which is perpendicular to the first straight line 72 until reflectivity is detected at a third point 80 at edge 21 and a corresponding signal is sent to the robot controller. The robot arm with fiber optic scanner device 52 is moved incrementally in the reverse direction along the second straight line 78 until reflectivity is detected at a fourth point 82 at edge 21 to determine the distance between the third point 80 and fourth point 82 and again a corresponding signal is sent to the robot controller. With this information the controller divides the distance between the third point 80 and fourth point 82 in half to determine the location of the center 84 of the second straight line 78. It will be noted that in the case of a round hole 20 the center 84 will be the exact center of the hole. This method of determining the center of circle has been used in geometry for many years. It will be understood that the robotic inspection system is not confined to round holes but nonround holes can also be scanned for size and location within the part being inspected. The speed at which a hole can be scanned is dependent on the increment movement size, hole size and whether it is a single or double dimension scan as represented by lines 72 and 78. It has been found that using this robotic inspection method typically a double dimension scan of a round hole with a quarter inch diameter takes between seven and ten seconds.

The robotic inspection system described above utilizes equipment and process steps utilizing a non-contact type sensor which minimizes the risk of part damage, robot damage and robot tooling or end effector damage. The inspection system also compensates for changes in part reflectivity that may occur from part to part within the manufacturing process. The increment step size of the robot arm movement is adjustable by programming and depends upon only the desired accuracy and repeatability by the user. As pointed out previously in connection with the structure shown in FIG. 2, the yoke 42 has two fiber optic scanner devices 52 located 180 degrees from each other at the respective terminal ends 64 and 65 of the yoke 42. This is to provide flexibility in the robot to inspect various holes in the part 10 to determine their status and these holes may be in the walls of the part 10 which are perpendicular to the wall 22 of part 10, such as wall 86. Thus by moving the robot arm 26 along the horizontal track 28 holes in these other walls may be inspected by the appropriate fiber optic scanner device by merely turning the yoke 90 degrees from the position shown in FIG. 1.

While there has been shown and described a specific embodiment of equipment for the robotic inspection system of this invention, it will be understood that it is not limited thereto and it is intended by the appended claims to cover all such modifications as fall within the true spirit and scope of the invention.

What is claimed is:

1. A method of inspecting and determining the status of a hole in the surface of a part comprising:
    placing a robot at a stationary position, said robot being programmed by a controller and having a movable arm with a fiber optic scanner device capable of sensing a reflective surface,
    placing the part to be inspected in a stationary fixture spaced from the robot,
    moving the robot arm with the fiber optic scanner device to a point spaced from the part surface,
    incrementally moving the robot arm with fiber optic scanner device closer to the part surface until light reflection from the part surface is detected by the fiber optic scanner device,
    sending a signal to the robot controller upon detecting light reflection from the part surface to stop further incremental moving of the robot arm with optic scanner device closer to the part,
    moving the robot arm with fiber optic scanner device in response to a signal from the robot controller parallel to the part surface to a predetermined position representing where the approximate hole location should be, and
    determining by reflectivity value the presence or absence of the hole and sending a corresponding signal to the robot controller.

2. The method of determining the status of a hole in the surface of a part according to claim 1 further comprising:
    moving the robot arm with fiber optic scanner device incrementally along a straight line until reflectivity is detected at a first point and sending a corresponding signal to the robot controller,
    moving the robot arm with fiber optic scanner device incrementally in the reverse direction along the straight line until reflectivity is detected at a second point to determine the distance between the first and second points and sending a corresponding signal to the robot controller, and
    dividing the distance between the first and second points in half to determine the center location of the straight line.

3. The method of determining the status of a hole in the surface of a part according to claim 2 which further comprises:
    moving the robot arm with optic scanner device incrementally along a second straight line perpendicular to the first straight line and through the center thereof until reflectivity is detected at a third point and sending a corresponding signal to the robot controller,
    moving the robot arm with fiber optic scanner device incrementally in the reverse direction along the second straight line until reflectivity is detected at a fourth point to determine the distance between the third and fourth points and sending a corresponding signal to the robot controller, dividing the distance between the third and fourth points in half to determine the location of the center of the second straight line.

4. The method of determining the status of a hole in the surface of a part according to claim 1 including the further step of aborting the inspection if the reflectivity value indicates absence of the hole and such a signal is sent to the robot controller.

5. The method of determining the status of a hole in the surface of a part according to claim 1 which further comprises:

stopping movement of the robot arm with fiber optic scanner device closer to the part surface after a predetermined number of incremental movements and aborting the rest of the steps of the method.

6. A method of determining the status of a hole in the surface of a part comprising:

placing a robot at a stationary position, said robot being programmed by a controller and having a movable arm with a fiber optic scanner device capable of sensing a reflective surface, placing the part to be inspected in a stationary fixture spaced from the robot, moving the robot arm with the fiber optic scanner device to a point spaced from the part surface, incrementally moving the robot arm with fiber optic scanner device closer to the part surface until light reflection from the part surface is detected by the fiber optic scanner device, sending a signal to the robot controller upon detecting light reflection from the part surface to stop further incremental moving of the robot arm with optic scanner device closer to the part, moving the robot arm with fiber optic scanner device parallel to the part surface to a predetermined position representing where the approximate hole location should be, determining by reflectivity value the presence or absence of the hole and sending a corresponding signal to the robot controller, if the hole is present, moving the robot arm with the fiber optic scanner device incrementally along a straight line until reflectivity is detected at a first point and sending a corresponding signal to the robot controller, moving the robot arm with fiber optic scanner device incrementally in the reverse direction along the straight line until reflectivity is detected at a second point to determine the distance between the first and second points and sending a corresponding signal to the robot controller, dividing the distance between the first and second points in half to determine the center location of the straight line, moving the robot arm with fiber optic scanner device incrementally along a second straight line perpendicular to the first straight line and through the center thereof until reflectivity is detected at a third point and sending a corresponding signal to the robot controller, moving the robot arm with fiber optic scanner device incrementally in the reverse direction along the second straight line until reflectivity is detected at a fourth point to determine the distance between the third and fourth points and sending a corresponding signal to the robot controller, and dividing the distance between the third and fourth points in half to determine the location of the center of the second straight line.

7. The method of determining the status of a hole in the surface of a part according to claim 6 wherein the rest of the steps of the method are aborted when the reflectivity value indicates absence of the hole and such a signal is sent to the robot controller.

8. The method of determining the status of a hole in the surface of a part according to claim 6 which comprises:

stopping movement of the robot arm with fiber optic scanner device closer to the part surface after a predetermined number of incremental movements and aborting the rest of the steps of the method.

* * * * *